3,318,864
ALANINE⁴-OXYTOCIN
Roger Boissonnas, Bottmingen, and Stephan Guttmann, Basel, Switzerland, assignors to Sandoz Ltd., Basel, Switzerland
No Drawing. Filed Jan. 6, 1964, Ser. No. 336,046
Claims priority, application Switzerland, Jan. 11, 1963, 358/63
3 Claims. (Cl. 260—112.5)

The present invention relates to a hitherto unknown polypeptide of Formula I,

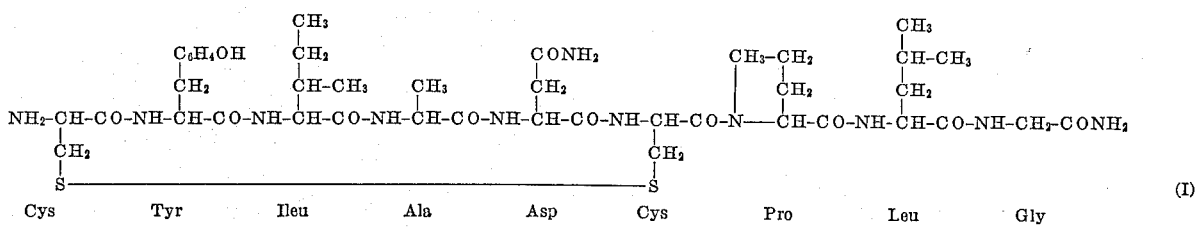

The unknown polypeptide of Formula I may be obtained by oxidizing a rectilinear nonapeptide of Formula V.

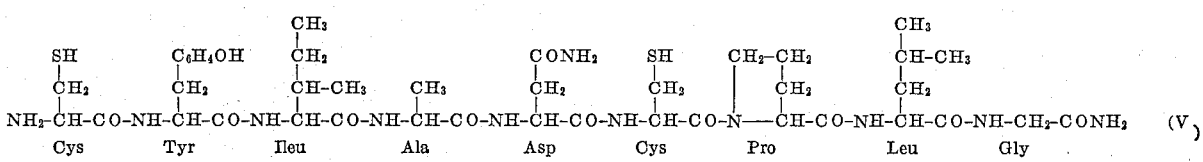

in aqueous solution to give the produce I. The compound V may be obtained by reducing with an alkali metal a nonapeptide derivative of Formula V,

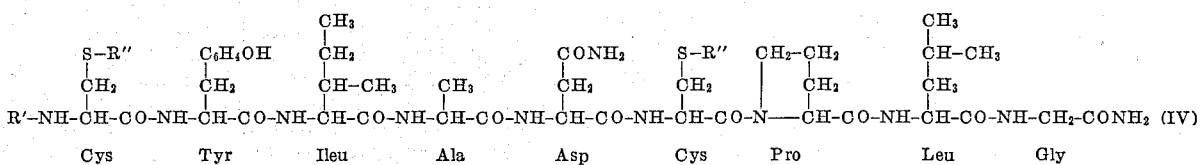

in which R' denotes a radical capable of protecting an amino radical in peptide synthesis, and
R" denotes a radical capable of protecting a sulfhydryl radical in peptide synthesis.

The nonapeptide derivative IV may be obtained by known methods for the production of peptides, it being possible to join together the amino acids in the order indicated above either one at a time or by first forming small peptide units and condensing these until compound IV is built up; for example, the hexapeptide derivative of formula II (a new compound),

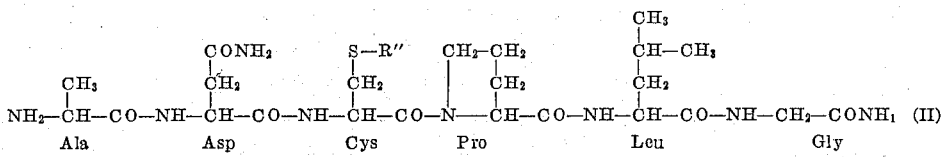

in which R" has the above significance, may be condensed with a reactive derivative of the free acid of formula III, $$\underset{\text{Cys}}{\text{R'}-\text{NH}-\overset{\overset{\displaystyle S-R''}{|}}{\underset{\underset{\displaystyle CH_2}{|}}{\text{CH}}}-\text{CO}-\text{NH}-} \underset{\text{Tyr}}{\overset{\overset{\displaystyle C_6H_4OH}{|}}{\underset{\underset{\displaystyle CH_2}{|}}{\text{CH}}}-\text{CO}-\text{NH}-} \underset{\text{Ileu}}{\overset{\overset{\displaystyle CH_3}{\underset{\displaystyle |}{\text{CH}_2}}}{\underset{\underset{\displaystyle CH-CH_3}{|}}{\text{CH}}}-\text{CO}_2\text{H}}$$

(III)

in which R' and R" have the above significance, to give the nonapeptide derivative IV.

Examples of radicals for temporarily blocking the amino radical in the above process are the carbobenzoxy, carbo-p-chlorobenzyloxy, p-toluenesulphenyl or triphenylmethyl radicals, while preferred radicals for protecting the sulfhydryl radical are phenyl, benzyl, p-bromobenzyl, p-chlorobenzyl, p-nitrobenzyl or p-xylyl radicals; the benzyl radical is particularly advantageous for this purpose.

It has been found that Compound I has a contracting effect on the mammary gland which is almost equal to that of natural oxytocin VI

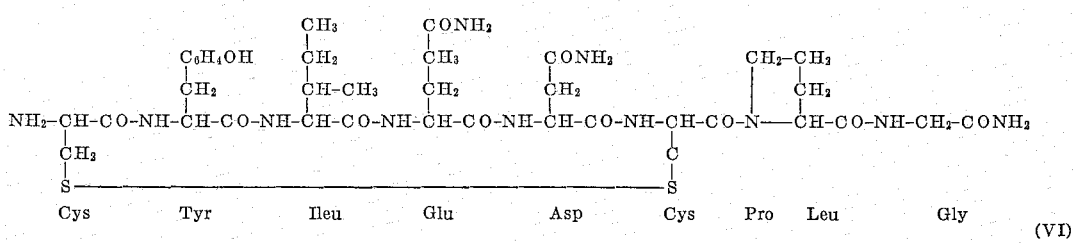

Cys  Tyr  Ileu  Glu  Asp  Cys  Pro  Leu  Gly  (VI)

which contains a glutamine radical in the position in which Compound I has the alanine radical. However, the uterus contracting action of Compound I is much smaller than that of natural oxytocin. It is emphasized that Compound I causes practically no increase in blood pressure or inhibition of diuresis.

These remarkable properties are of great advantage in therapy, especially in gynaecology where breast-feeding troubles are experienced due to difficulties in evacuating the mammary gland, pain in feeding or pumping and in galactostasis or incipient mastitis puerperalis. These properties of Compound I are especially remarkable as modification of the oxytocin molecule as regards just one amino acid radical generally leads to a loss of activity; thus, by replacing asparagine with glutamine a substance results with practically no uterus contracting action and only a weak action on the mammary gland. Even in the case of the most trivial changes in the oxytocin molecule, e.g. the replacement of asparagine with iso-asparagine and glutamine with iso-glutamine, the oxytocic activity and the action on the mammary gland are lost.

One method of carrying out the process of the invention is, for example, as follows:

N - carbobenxozy-L-alanine-p-nitrophenyl-ester is condensed with L-asparaginyl-S-benzyl-L-cysteinyl-L-prolyl-L-leucyl-glycinamide to give N-carbobenzoxy-L-alanyl-L-asparaginyl - S - benzyl - L - cysteinyl - L- prolyl-L-leucyl-glycinamide. After splitting off the carbobenzoxy radical the resulting L-alanyl-L-asparaginyl-S-benzyl-L-cysteinyl-L - prolyl - L- leucyl-glycinamide is condensed with N-p-toluenesulphonyl - S - benzyl - L-cysteinyl-L-tyrosyl-L-isoleucine-p-nitro-phenylester to give N-p-toluenesulphonyl-S - benzyl - L - cysteinyl - L - tyrosyl - L - isoleucyl - L-alanyl - L - asparaginyl - S - benzyl - L - cysteinyl - L-prolyl-L-leucyl-glycinamide. This nonapeptide derivative is treated with an alkali metal, preferably sodium or potassium in liquid ammonia, whereby the rectilinear nonapeptide V results. This is converted into the biologically active, cyclic polypeptide I by oxidation, preferably with air, oxygen or hydrogen peroxide in aqueous solution.

The polypeptide I may be used as a pharmaceutical as such or in the form of appropriate medicinal preparations for administration, e.g. parenterally, enterally or intranasally. In order to produce such medicinal preparations, the compounds of the invention are worked up with organic or inorganic adjuvants which are inert and physiologically acceptable. Examples of such adjuvants are as follows:

(1) Tablets and dragées: lactose, starch talc and stearic acid
(2) Syrups: solutions of cane sugar, invert sugar and glucose
(3) Injectable solutions: water, alcohols, glycerine and vegetable oils
(4) Suppositories: natural or hardened oils and waxes.

The preparations may furthermore contain suitable preserving, stabilizing or wetting agents, solubilizers, sweetening and coloring substances or flavorings.

The invention thus also includes pharmaceutical compositions containing, in addition to a physiologically acceptable inert carrier, the Compound I above.

EXAMPLE 1

(a) *N-carbobenzoxy-L-alanyl-L-asparaginyl-S-benzyl-L-cysteinyl-L-prolyl-L-leucyl-glycinamide*

29 g. of N - carbobenzoxy-L-asparaginyl - S - benzyl-L-cysteinyl-L-prolyl-L-leucyl-glycinamide are dissolved in 400 cc. of anhydrous acetic acid which has been saturated with hydrogen bromide. It is left to stand for one hour at 20°, evaporated in a vacuum at a temperature below 40°, the residue washed carefully with diethylether and dissolved in 60 cc. of dimethylformamide after the addition of 5.6 cc. of triethylamine. 15 g. of N-carbobenzoxy-L-alanine-p-nitrophenylester are immediately added to this solution. After 20 hours at 20° a solid mass results which is suspended in 500 cc. of ethyl acetate. The precipitate is filtered, washed with ethyl acetate and absolute ethanol and dried in a vacuum. N - carbobenzoxy - L-alanyl - L - asparaginyl-S-benzyl - L - cysteinyl-L-prolyl-L-leucyl-glycinamide is obtained, having a melting point of 238°. $[\alpha]_D^{21} = -93°$ ($c=1$ in 95% acetic acid).

(b) *N-p-toluenesulfonyl-S-benzyl-L-cysteinyl-L-tyrosyl-L-isoleucyl-L-alanyl-L-asparaginyl-S-benzyl-L-cysteinyl-L-prolyl-L-leucyl-glycinamide*

17 g. of N - carbobenzoxy - L - alanyl-L-asparaginyl-S-benzyl-L-cysteinyl-L-prolyl-L-leucyl-glycinamide are dissolved in 300 cc. of anhydrous acetic acid which has been saturated with hydrogen bromide, it is left to stand for one hour at 20° and evaporated in a vacuum at a temperature below 40°. The residue is carefully washed with diethylether, dissolved in 60 cc. of dimethylformamide, 2.8 cc. of triethylamine are added and filtration is effected. 15 g. of N-p-toluenesulfonyl-S-benzyl-L-cysteinyl-L-tyrosyl-L-isoleucine-p-nitro-phenylester are added to the filtrate. It is left to stand over night at 20° and the resulting solid mass is suspended in 400 cc. of ethyl acetate. The precipitate is filtered, it is washed with ethyl acetate and hot methanol and dried in a vacuum. N-p-toluenesulfonyl-S-benzyl - L - cysteinyl-L-tyrosyl-L-isoleucyl-L - alanyl-L-asparaginyl - S-benzyl-L-cysteinyl-L-prolyl-L-leucyl - glycinamide is obtained having a melting point of 240°. $[\alpha]_D^{22} = -39°$ ($c. = 1$ in dimethylformamide).

(c) *L-cysteinyl-L-tyrosyl-L-isoleucyl-L-alanyl-L-asparaginyl-L-cysteinyl-L-propyl-L-leucyl-glycinamide*

Sodium or potassium metal is added to a solution of 5 g. of N-p-toluenesulfonyl-S-benzyl-L-cysteinyl-L-tyrosyl-L-isoleucyl-L-alanyl-L - asparaginyl-S-benzyl-L-cysteinyl-L-prolyl-L-leucyl-glycinamide in 1200 cc. of dry liquid ammonia while stirring at the boiling point of the solution until a stable blue coloration results. After the addition of 1 g. of ammonium chloride the solution is evaporated to dryness. The residue contains L-cysteinyl-L-tyrosly-L-isoleucyl-L-alanyl-L - asparaginyl-L-cysteinyl-L-prolyl-L-leucyl-glycinamide.

(d) *Polypeptide Compound I*

The material, containing L-cysteinyl-L-tyrosyl-L-isoleucyl-L-alanyl-L-asparaginyl - L - cysteinyl-L-prolyl-L- leucyl-glycinamide from step (c) above is dissolved in 5 litres of 0.01 N acetic acid and oxidized with a pH value of 6.5–8.0 by introducing air or oxygen for one hour at 0–40°. The solution, which contains the substance I, is brought to a pH value of 4.0–5.0 and after the addition of 50 g. of sodium chloride it is evaporated to dryness, whereby a dry powder results which is stable. It may be stored and when used it may be dissolved to a clear solution. However, the solution may also be used as such, if desired after diluting with water or a salt solution.

EXAMPLE 2

The same procedure as in Example 1 (a) is used. The process is further effected as in Example 1 (b), except that instead of N-p-toluenesulfonyl-S-benzyl-L-cysteinyl-L-tyrosyl-L-isoleucine-p-nitrophenylester an equivalent amount of N-p-toluenesulfonyl-S-benzyl - L - cysteinyl-L-tyrosyl-L-isoleucyl-azide is used. The process is further effected as in Example 1 (c) and (d).

EXAMPLE 3

The same procedure as in Example 1 (a) is used. The process is further effected as in Example 1 (b), except that instead of N-p-toluenesulfonyl-S-benzyl-L-cysteinyl-L-tyrosyl-L-isoleucine - p - nitrophenylester an equivalent amount of N - carbobenzoxy - S - benzyl-L-cysteinyl-L-tyrosyl-L-isoleucyl-azide is used. The process is further effected as in Example 1 (c) and (d).

EXAMPLE 4

The same procedure as in Example 1, 2 or 3 is used. However, final oxidation is effected at 0–40° by the addition of 7.5 cc. of a N solution of hydrogen peroxide in water at a pH value of 4.0–6.0 (instead of oxidation by introducing air or oxygen).

What we claim is:

1. A polypeptide of the formula

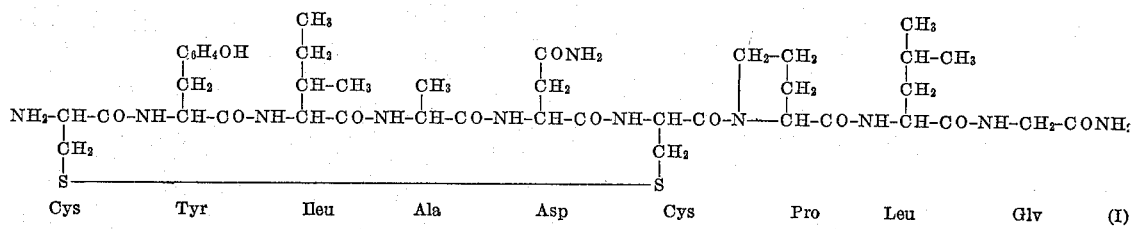

all of whose amino acids (except glycine) are of the L configuration.

2. A polypeptide of the formula:

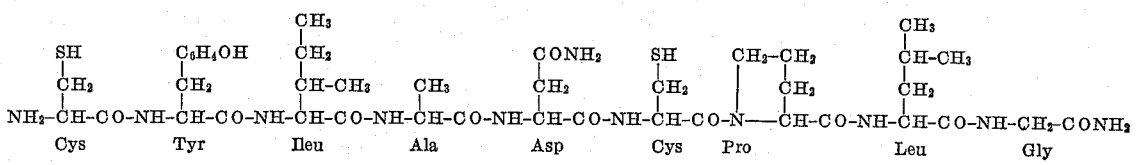

all of whose amino acids (except glycine) are of the L configuration.

3. A polypeptide of the formula:

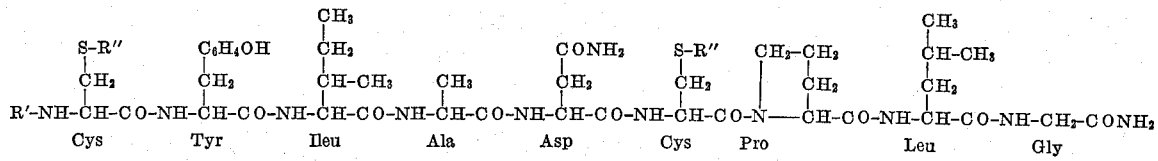

all of whose amino acids (except glycine) are of the L configuration, in which R' is a member selected from the group consisting of carbobenzoxy, carbo-p-chlorobenzyloxy, p-toluenesulfonyl and triphenylmethyl, and R'' is a member selected from the group consisting of phenyl, benzyl, p-bromobenzyl, p-chlorobenzyl, p-nitrobenzyl and p-xylyl.

References Cited by the Examiner

FOREIGN PATENTS 6,400,037   7/1964   Netherlands.

OTHER REFERENCES

Bodanszky et al., J. Am. Chem. Soc., 81, 5688–5691 (1959).

Jaquenod et al., Halv. Chim. Acta 45, 1462–1472 (1962).

Schroder et al., The Peptides, vol. II, New York, Academic Press, 1966, pp. 281–374.

LEWIS GOTTS, *Primary Examiner.*

M. M. KASSENOFF, *Assistant Examiner.*